March 1, 1938.  L. W. SHASTOCK  2,110,029
DRUM HEAD AND METHOD OF MAKING THE SAME
Filed Jan. 7, 1936
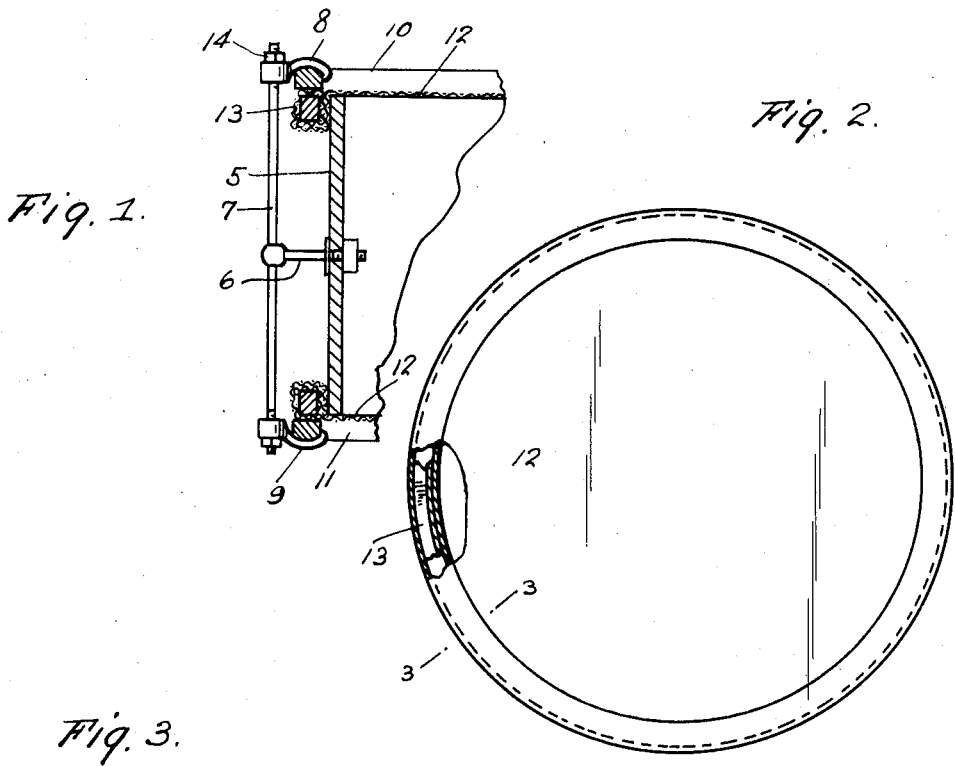
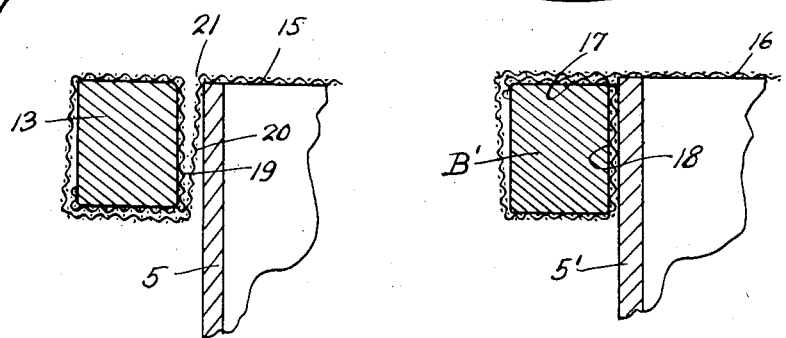
Inventor
L. W. Shastock
By Clarence A. O'Brien
Attorney Patented Mar. 1, 1938

2,110,029

UNITED STATES PATENT OFFICE 2,110,029

DRUM HEAD AND METHOD OF MAKING THE SAME

Louis W. Shastock, Cleveland, Ohio

Application January 7, 1936, Serial No. 58,015

4 Claims. (Cl. 8—20)

My invention relates generally to drum heads for different types of musical instruments, including trap-drums, snare drums, banjoes, and the like, including bass drums, and to a method of making the same, and an important object of the invention is to provide drum heads which are equal to or superior to ordinary drum heads in texture, musical efficiency, and capacity to retain adjustment, while being greatly superior to the ordinary drum heads in point of durability, and imperviousness to deterioration from moisture and climatic changes.

Another important object of the invention is to provide drum heads of the superior character indicated above which can be produced more easily and cheaply than ordinary drum heads and which are stronger and more manageable.

Another important object of the invention is to provide a novel method of tucking the drum head on its hoop and mounting the hoop on the drum shell whereby the drum head is more securely and effectively held.

Other important objects of the invention will be apparent from a reading of the following description in connection with the drawing, wherein for purposes of illustration I have shown a preferred embodiment of the drum head of the invention.

In the drawing:—

Figure 1 is a transverse vertical sectional view through a drum showing drum heads in accordance with the invention mounted thereon.

Figure 2 is a top plan view of a drum head in accordance with the invention and cut away to show the method of tucking the drum head on the hoop.

Figure 3 is an enlarged transverse vertical sectional view through a portion of a drum showing a drum head in accordance with the invention mounted thereon illustrating particularly the reverse method of tucking and rolling the drum on the hoop.

Figure 4 is a view similar to Figure 3 illustrating the ordinary or presently practiced method of tucking and rolling the drum head on the hoop.

Referring in detail to the drawing, the numeral 5 generally designates a drum shell or body having mounted thereto as indicated by the numeral 6 the clamping member 7 which has the clamping arms 8 and 9 arranged to engage the clamping hoops 10 and 11 which engage the outer sides of the drum heads 12 over the drum head hoops 13 in a manner to clamp the material of the drum head around the drum head hoop 13 and between the hoop 13 and the drum shell 5. By adjusting the nuts 14 on the ends of the clamping members 7 the tension of the drum heads 12 may be individually adjusted to tune the drum in the ordinary manner.

The drum head 12 of the present invention comprises the drum head hoop 13 and the drum head material 15. In the ordinary manner of tucking the conventional drum head 16 as shown in Figure 4 the material is laid on the top of the hoop 13' and then brought down between the hoop 13' and the drum shell 5' and then brought under the hoop 13' and up along the outside thereof and then over the top or outer side of the hoop 13' and then over the adjacent end of the drum shell in a manner to clamp the top flight 17 of the material. In this method which is presently practiced, there is only one ply or flight of the drum head material 18 between the hoop 13' and the drum shell 5'.

In accordance with the present invention the drum head material 15 is reverse tucked with respect to the method shown in Figure 4, and by reference to Figure 3 it will be found that the drum head material is first laid under the hoop 13 and then brought up along the inner or radially inward side of the hoop and then outwardly over the top of the hoop or outer side of the hoop and then brought down along the outside of the hoop and under the hoop and then up between the hoop and the drum shell 5 whereby two plies or flights of the material designated by the numerals 19 and 20 are located between the hoop 13 and the shell 5, and the flight 20 is drawn over the sharp corner of the drum shell as indicated by the numeral 21, so that a much stronger and less liable to slip arrangement is made, which insures not only a proper taking up of the stretching of the drum head in service, but which when once adjusted in tuning the drum, will much longer hold the adjustment than the presently practiced method illustrated in Figure 4, wherein the outer flight which goes across the drum end is strung straight across from the outer side of the hoop 13', so that a tendency to tilt the hoop 13' exists when the drum head is taut and a tendency to relax the drum hoop 13' when the drum head material becomes slack, so that a tendency to loosen the adjustment which does not exist in my improvement arrangement does exist in the old method shown in Figure 4.

The present invention is concerned not solely with the mechanical arrangement of the novel drum head and the method of tucking the same, but also and more importantly, with the production of the novel drum head material.

In accordance with the present invention the drum head is provided by taking a cloth of high cellulose content preferably cotton, and raw cotton and stretching it upon a hoop 13 and then attaching the tucked portions to the hoop with silicate of soda which is permitted to dry.

The drum head is then dipped in a solution consisting of sodium hydroxide for the purpose of mercerizing the cloth.

The mercerized drum head is then rinsed to remove substantially all of the mercerizing agent.

The drum head is then neutralized in a mild solution of water and sulphuric acid.

The drum head is then dipped in a zinc chloride lye solution.

The drum head is then rinsed out gradually by reducing the lye solution with water until the last traces of zinc chloride lye solution have disappeared.

The drum head is then calendered or ironed out at a pressure of about 500 pounds to the square inch after drying.

The dry drum head is then subjected to a lacquering process to make it impervious to moisture.

In addition to the mercerizing the purpose of the zinc chloride lye solution is to add additional stiffness and strength to the cloth which is not completely accomplished by the mercerizing process.

The zinc chloride lye solution is composed of substantially the following ingredients:—

Zinc chloride _____ by weight __ 71%
Calcium chloride _____ do ____ 0.6%
Specific gravity—at a temperature of 20 degrees C _____ 1.908

Working is effected at a temperature of approximately 60 degrees C.

The mercerizing solution is sodium hydroxide.

The calendering is essential in order to smooth out the cloth previously subjected to the operations outlined above.

The silicate of soda is applied to the drum hoop preferably by dipping the drum hoop in a solution of the silicate of soda and then permitting it to dry, whereupon the cloth is then tucked upon the drum hoop in the regular manner that calfskin heads are tucked upon drum hoops, except that it may be reversed in accordance with the present invention and the resultant is properly adhered to the drum hoop by the silicate of soda.

The sodium hydroxide mercerizing solution is made up of:—

1 pound of sodium hydroxide (NaOH)
1 gallon of water ($H_2O$).

This mercerizing solution has a solvent action upon the cotton fabric by dissolving the cotton in proportion to the time the cotton is immersed in the solution. There is no chemical reaction taking place between the cotton and the sodium hydroxide because after being immersed in water the cotton is immediately immersed in a mild sulphuric acid solution. As pointed out above, the said sulphuric acid solution being composed of substantially:—

1 ounce of sulphuric acid C. P. ($H_2SO_4$).
1 gallon of water ($H_2O$).

The acid has a tendency to neutralize the alkali.

When the mercerized cloth is immersed in the zinc chloride lye solution there is no chemical reaction because the cotton is again neutralized by dissolving the remaining zinc chloride lye in weakened solutions until it has entirely disappeared.

Cotton has a strong affinity for both sodium hydroxide and zinc chloride which have a tendency to considerably strengthen the fibers of the cotton cloth. The calendering operation has no other effect than to smooth or iron out the cloth, while the lacquering steps protect it from moisture.

Suitable lacquers may be used, such as pyroxylin and similar lacquers having been found very satisfactory.

Both the mercerizing and the zinc chloride lye solution have a severe contracting or shrinking effect upon the cloth and draw the same up very considerably, and for this reason the reverse method of tucking the drum head material on the hoop is very effective.

Although I have shown and described herein preferred embodiments of the article and of the process or method of the invention, it is to be definitely understood that I do not desire to limit the application of the invention thereto, and any change or changes may be made in the materials, and in the structure and arrangement of parts, and in the sequence and duration of steps and operations, within the spirit of the invention and the scope of the subjoined claims.

What is claimed is:—

1. A process of producing drum head material of the character described, said process comprising mercerizing a sheet of cloth of high cellulose content by immersing the sheet in a sodium hydroxide solution of about 1 lb. of sodium hydroxide in 1 gallon of water and rinsing the sheet in water to remove the mercerizing agent therefrom; then immersing the rinsed mercerized sheet in a mild aqueous solution of sulphuric acid and so as to neutralize the sheet; then immersing the neutralized sheet in zinc chloride lye solution containing about 71% by weight of zinc chloride and then rinsing the sheet to remove all traces of the zinc chloride lye from the sheet, said operations being carried out while the cloth is stretched in all directions.

2. A process of producing drum head material of the character described, said process comprising mercerizing a sheet of cloth of high cellulose content by immersing the sheet in a sodium hydroxide solution of about 1 lb. of sodium hydroxide in 1 gallon of water and rinsing the sheet in water to remove the mercerizing agent therefrom; then immersing the rinsed mercerized sheet in a mild aqueous solution of sulphuric acid so as to neutralize the sheet; then immersing the neutralized sheet in zinc chloride lye solution containing about 71% by weight of zinc chloride and then rinsing the sheet to remove all traces of the zinc chloride lye from the sheet, said solution of sulphuric acid comprising about 1 ounce of sulphuric acid C. P. and 1 gallon of water, said operations being carried out while the cloth is stretched in all directions.

3. A process of producing drum head material of the character described, said process comprising mercerizing a sheet of cloth of high cellulose content by immersing the sheet in a sodium hydroxide solution of about 1 lb. of sodium hydroxide in 1 gallon of water and rinsing the sheet in water to remove the mercerizing agent therefrom; then immersing the rinsed mercerized sheet in a mild aqueous solution of sulphuric acid so as to neutralize the sheet; then immersing the neutralized sheet in zinc chloride lye solution containing about 71% by weight of zinc chloride and then rinsing the sheet to remove all traces of the zinc chloride lye from the sheet, said solution of sulphuric acid comprising about 1 ounce of sulphuric acid C. P. and 1 gallon of water, then drying the rinsed sheet, and calendering and lacquering the same, said operations being carried out while the cloth is stretched in all directions.

4. A process of producing drum head material of the character described, said process comprising mercerizing a sheet of cloth of high cellulose content by immersing the sheet in a sodium hydroxide solution of about 1 lb. of sodium hydroxide in 1 gallon of water and rinsing the sheet in water to remove the mercerizing agent therefrom; then immersing the rinsed mercerized sheet in a mild aqueous solution of sulphuric acid so as to neutralize the sheet; then immersing the neutralized sheet in zinc chloride lye solution containing about 71% by weight of zinc chloride and then rinsing the sheet to remove all traces of the zinc chloride lye from the sheet, said solution of sulphuric acid comprising about 1 ounce of sulphuric acid C. P. and 1 gallon of water, the foregoing operations being carried out at an approximate temperature of 60 degrees centigrade said operations being carried out while the cloth is stretched in all directions.

LOUIS W. SHASTOCK.